United States Patent [19]

Hirst

[11] 4,379,962
[45] Apr. 12, 1983

[54] SUPPORT STRUCTURE FOR PLASMA ARC CUTTING TORCH SHIELD

[75] Inventor: Richard W. Hirst, Hazel Green, Wis.

[73] Assignee: Deere & Company, Moline, Ill.

[21] Appl. No.: 259,128

[22] Filed: Apr. 30, 1981

[51] Int. Cl.³ .............................................. B23K 9/00
[52] U.S. Cl. ................................. 219/121 P; 350/318; 219/147
[58] Field of Search ............. 219/137 R, 147, 146.52, 219/121 PJ, 121 PK, 121 PM, 121 P; 169/48; 228/59; 350/311, 315, 318

[56] References Cited

U.S. PATENT DOCUMENTS

| Re. 29,684 | 6/1978 | Gordon | 219/147 |
| 2,194,573 | 3/1940 | Schulz | 219/147 |
| 4,063,059 | 12/1977 | Brolund et al. | |

Primary Examiner—M. H. Paschall

[57] ABSTRACT

A shield for a plasma arc torch is carried by a support mounted so as to be easily disassembled, to permit inspection and/or servicing of components surrounded by the shield by merely lifting up on the support to disengage a pair of projections at the opposite ends thereof from a pair of receptacles fixed to the frame of the machine which supports the torch.

10 Claims, 3 Drawing Figures

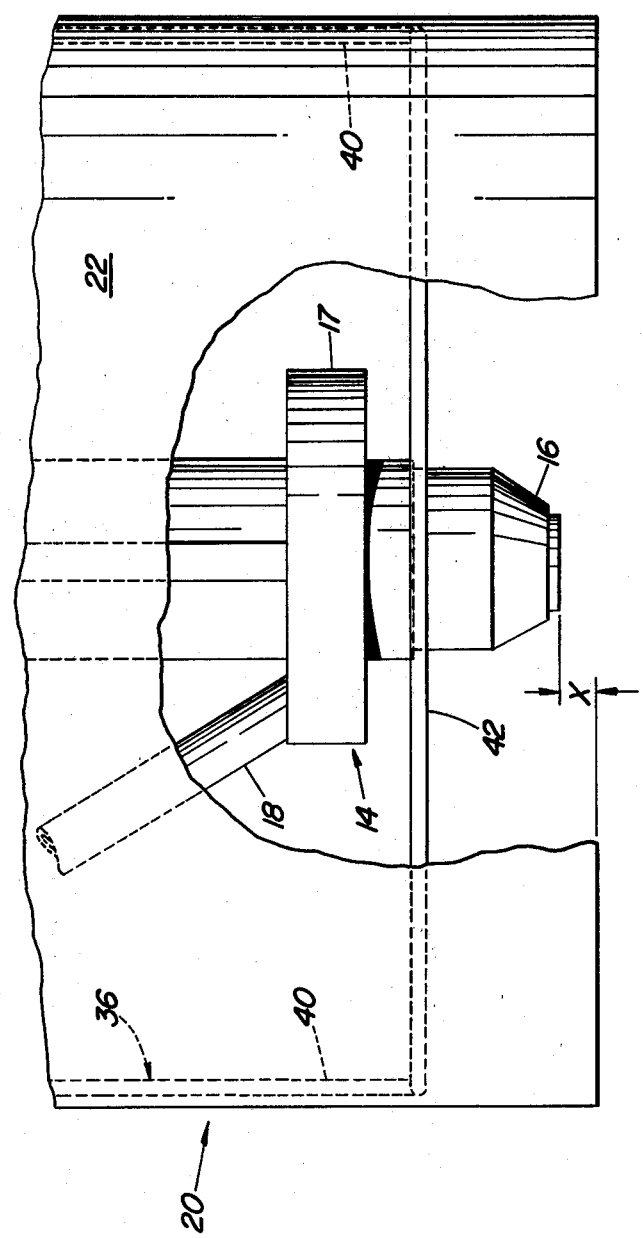

SUPPORT STRUCTURE FOR PLASMA ARC CUTTING TORCH SHIELD

BACKGROUND OF THE INVENTION

The present invention relates to shielding assemblies for plasma arc cutting torches and more specifically relates to support structures for the shields of such assemblies.

Plasma arc cutting torches are used in manufacturing operations to perform cutting operations on steel plate work pieces. In order to protect the eyes of workers in the vicinity of these torches, opaque shields or translucent shields, capable of filtering out or reducing the intensity of visible light, infrared and ultraviolet radiation from the torch are placed in surrounding relationship to the torch. These shields perform the additional functions of reducing the level of the noise generated by the torch, of confining the water from the spray ring associated with the torch and of serving as an aid to the operator in maintaining torch distance above the work piece.

Heretofore, the shielding for plasma arc cutting torches has always been mounted such that considerable time is required in removing the shielding in order to perform torch maintenance or to inspect the spray ring.

SUMMARY OF THE INVENTION

According to the present invention, there is provided an improved structure for supporting plasma arc cutting torch shields.

An object of the invention is to provide a support for shielding for a plasma arc cutting torch, which can be easily removed and reassembled for permitting inspection and service of components surrounded by the shielding.

Another object of the invention is to provide a support, as set forth in the preceding object, which includes a mounting bracket for supporting a shield holder, the bracket being standardized for use with various machines with which plasma arc cutting torches are commonly used.

A more specific object of the invention is to provide a shield holder which is mounted so as to be disassembled by merely lifting up on the shield holder.

These and other objects will become apparent from a reading of the ensuing description, together with the appended drawings.

BRIEF DESCRIPTION OF THE DRAWINGS

FIG. 3 is a front elevational view showing the relationship of the shielding to the lower end of the torch with a portion of the shielding broken away to expose the torch nozzle.

DESCRIPTION OF THE PREFERRED EMBODIMENT

Figure 1:
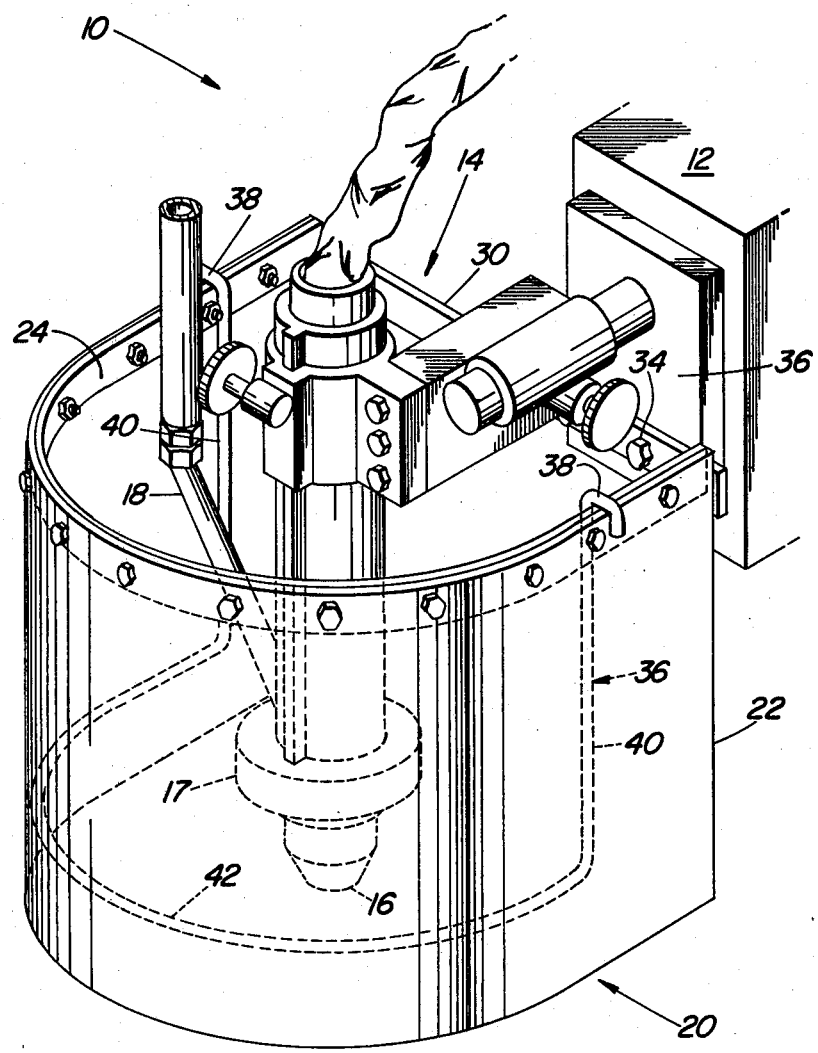
FIG. 1 is a perspective view of a machine equipped with a plasma arc cutting torch enclosed by shielding supported in accordance with the principles of the present invention.

Referring now to FIG. 1, therein is shown a machine 10 used for fabricating plate steel parts. The machine 10 has a frame 12 which supports a plasma arc cutting torch 14 for performing cutting operations on plate steel work pieces.

Referring to FIG. 3, in addition to FIG. 1, it can be seen that the cutting torch 14 includes a downwardly directed nozzle 16. Associated with the torch 14 is a water spray ring 17 to which water is conveyed by a conduit 18. A shield assembly 20 is provided which includes a shield 22 of translucent or opaque flexible material which is arranged, in surrounding relationship to the nozzle 16, in a manner described in more detail below. The shield 22 may be constructed from translucent or opaque flexible material. If translucent, the material should have the capability to filter out or reduce the intensity of visible light, infrared and ultraviolet radiation from the plasma arc during cutting operation.

Figure 2:
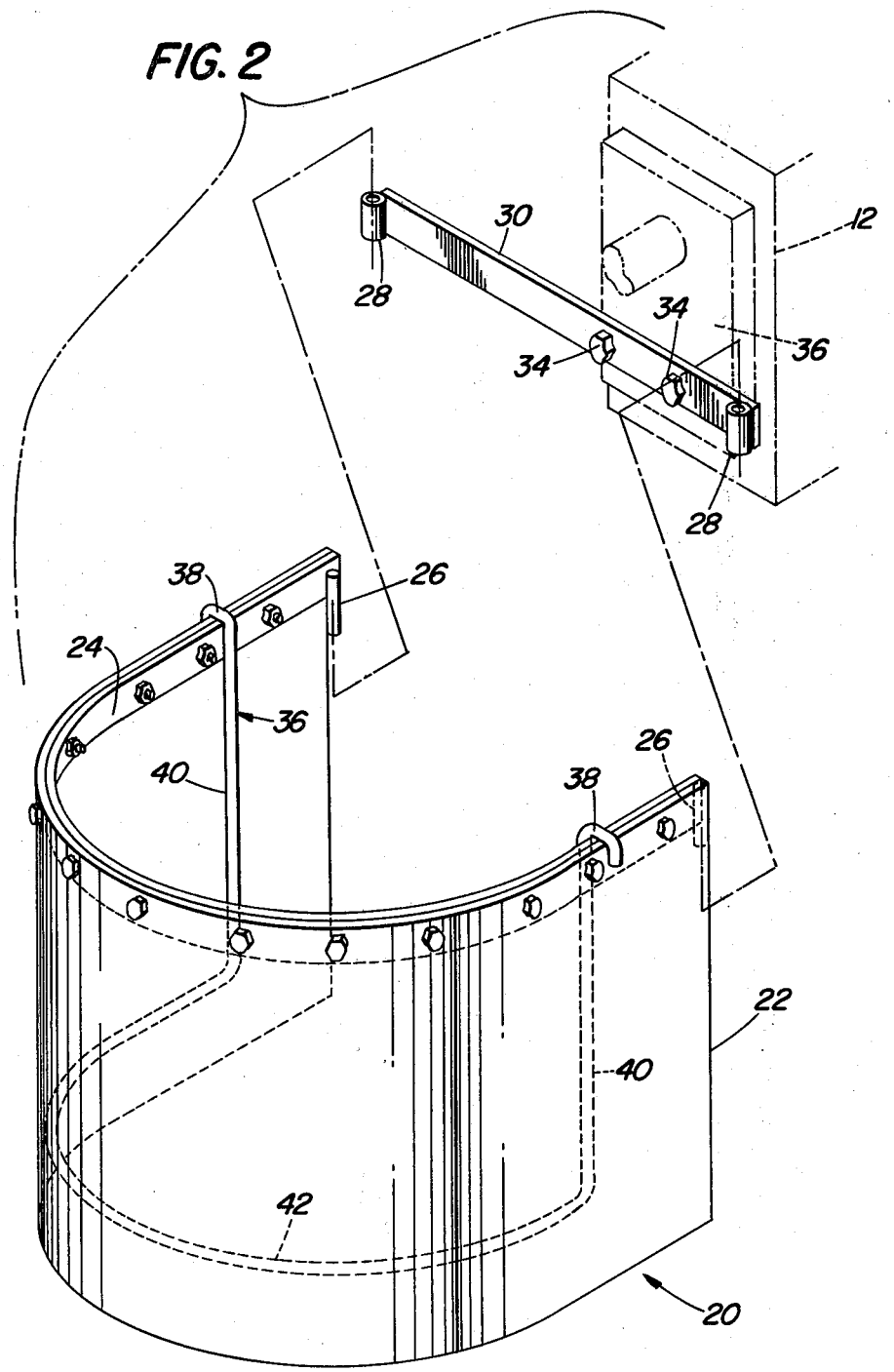
FIG. 2 is a perspective view showing the torch shield together with but removed from a supporting bracket therefor.

The shield assembly 20 includes a shield support 24 comprising an elongate sheet metal band which is preferably in a straight configuration prior to installation. As can best be seen in FIG. 2, the support 24 further comprises a pair of downward projections 26, in the form of a pair of rods or pins, respectively welded to the opposite ends of the metal band. The pair of projections 26 are respectively received in a pair of complimentary shaped receptacles 28, in the form of short tubes, respectively welded to the opposite ends of a metal strap 30 which is bolted, as at 34, to a vertical transverse surface 36 of the machine frame 12 so as to dispose the receptacles 28 at a preselected elevation above the nozzle 16 and at respective locations behind and equidistant from the nozzle 16. Also, with respect to an imaginary vertical cylinder disposed coaxially to the nozzle 16, the pair of receptacles 28 are respectively located in vertical, parallel planes that are tangent to the cylinder. Also, it is to be noted that the shield support 24 has opposite end portions which are likewise respectively located in the vertical, parallel planes and are interconnected or joined by an arcuate intermediate portion which lies in the surface of the imaginary cylinder. The shield 22 is rectangular and has an upper edge portion secured to the support 24 and has a lower edge portion which extends below the nozzle a preselected distance so as to aid the operator in maintaining the nozzle at a fixed distance X above the work piece during cutting operation.

When the geometry of the machine to which the strap 30 is bolted is such as to require the strap to be in a relatively high position, as shown, the height of the shield 22 will be such that the shield may become deflected towards the nozzle when relative movement occurs between the nozzle and the work piece. The shield 22 is prevented from undergoing such deflection through means of an auxiliary support 36 in the form of a rod having opposite end portions bent into hooks 38 which are respectively received over the end portions of the shield support 24. Vertical portions 40 of the support are joined to the hooks and extend downwardly to points located inwardly of the shield 22 and slightly above the lower edge of the latter. An intermediate portion 42 joins the vertical portions 40 and extends horizontally in a path which is adjacent to the inner surface of the shield. Thus, should the shield 22 have a tendency to deflect inwardly toward the nozzle, it will come into contact with the auxiliary support 36.

For installations where the strap 30 can be disposed at a relatively low position, the height of the shield 22 will be such that the shield will be stiff enough so as not to have the tendency to deflect, in any appreciable amount, toward the nozzle, during cutting operations.

It will be appreciated then that if an operator desires to inspect and/or service those components of the torch 14 which are surrounded by the shield 22, he may easily do so by removing the shield 22 by merely lifting the shield support 24 so as to disengage the projections 26 from the receptacles 28. Once the inspection and/or service is completed, the shield 22 may once again be positioned in place by inserting the projections 26 into the receptacles 28.

I claim:

1. In a machine including a frame supporting a plasma arc cutting torch having a downwardly projecting nozzle and a shielding structure including a shield supported in surrounding relationship to the nozzle, an improved shield support structure, comprising: a pair of upwardly opening receptacles mounted on the frame in spaced relationship to each other at respective locations elevated above and equidistant from the torch nozzle; an elongate shield holder having downwardly extending projections at its opposite ends; said projections being respectively releasably received in the pair of upwardly opening receptacles; said shield holder being located approximately at the level of the receptacles and having an arcuate portion extending at least 180° about the torch nozzle; and a plasma arc shield secured to the shield holder in depending relationship thereto and having a lower edge located no higher than the bottom of the nozzle.

2. The machine defined in claim 1 wherein said shield holder is in the form of a band of sheet steel which, prior to installation, is flat and becomes arcuately curved when installed.

3. The machine defined in claim 1 wherein the pair of receptacles are respectively formed by a pair of tubes and wherein the projections are respectively formed by a pair of pins fixed to the opposite ends of the shield holder and sized to fit tightly within the tubes.

4. The machine defined in claim 3 wherein the pair of tubes are fixed to the opposite ends of a strap.

5. The machine defined in claim 1 wherein the pair of receptacles are at an elevation for disposing the shield holder at a desired elevation relative to the nozzle; and an auxiliary support in the form of an arcuate rod having opposite ends formed into hook portions for selectively hanging the rod from the shield holder; said hook portions respectively including upright leg portions terminating approximately at the level of the bottom of the nozzle and joined together by an intermediate curved portion located close to but inwardly of the bottom of the shield so as to prevent the latter from deflecting toward the nozzle during operation of the torch.

6. In a machine having a frame supporting a plasma arc torch having a downwardly projecting nozzle and supporting a shielding structure including a plasma arc shield surrounding the nozzle, an improved shield support structure, comprising: a horizontally disposed elongate shield holder having opposite end portions respectively extending tangent to an imaginary vertical cylinder surrounding the nozzle and being joined together by an arcuate intermediate portion located on said cylinder; telescopic joint means respectively interconnecting the opposite ends of the shield holder to the frame for permitting the holder to be disconnected from the frame by lifting up on the holder; and a plasma arc shield suspended from the holder and having a lower horizontal edge located no higher than the bottom of the nozzle.

7. The machine defined in claim 6 wherein the telescopic joint means includes a pair of upwardly opening tubes, supported from the frame at locations spaced from each other by a distance approximately equal to the diameter of the imaginary cylinder, and a pair of vertical pins respectively fixed to the opposite ends of the shield holder and sized to fit tightly within the pair of tubes.

8. The machine defined in claim 6 wherein the shield holder is in the form of a narrow band of sheet steel.

9. The machine defined in claim 7 wherein the pair of tubes are respectively secured to the opposite ends of a mounting strap which is, in turn, secured to the frame.

10. The machine defined in claim 7 and further including an elongate auxiliary shield supporting means having opposite ends respectively releasably secured to the opposite end portions of the shield holder and having a central portion located inwardly of and adjacent to the majority of the length of the bottom edge of the plasma arc shield.

* * * * *